United States Patent [19]

Bequet et al.

[11] 3,744,952
[45] July 10, 1973

[54] CORRUGATION APPARATUS

[75] Inventors: Jean Francois Bequet, Brussels; Roger Van Asbroeck, Neerijse; Paul Du Bois, Braine-L'Alleud, all of Belgium

[73] Assignee: Solvay & Cie, Brussels, Belgium

[22] Filed: Dec. 30, 1970

[21] Appl. No.: 102,606

[30] Foreign Application Priority Data
Dec. 31, 1969 Belgium .................................. 83422

[52] U.S. Cl. ............................... 425/336, 425/396
[51] Int. Cl. ................................................ B28b 3/12
[58] Field of Search ................... 18/19 A, 4 S, 4 B, 18/4 P, 4 R; 156/205, 206, 462, 595, 596; 264/286, 287; 425/303, 336, 369, 396

[56] References Cited
UNITED STATES PATENTS

| 2,513,777 | 7/1950 | Andre | 156/205 X |
| 2,695,652 | 11/1954 | Segil | 18/19 A |
| 3,102,776 | 9/1963 | Steinmann et al. | 18/19 A X |
| 2,158,087 | 5/1939 | Rowe et al. | 264/287 |

*Primary Examiner*—H. A. Kilby, Jr.
*Attorney*—Spencer & Kaye

[57] ABSTRACT

An apparatus for the continuous polygonal corrugation of hot sheets of thermoplastic material has continuous elements formed of metallic wires welded end-to-end. These elements are arranged in space at the locations where the sheets should normally be bent for producing the desired corrugation. The elements moving with the sheets during passage thereof through the apparatus.

7 Claims, 4 Drawing Figures

Patented July 10, 1973 3,744,952

INVENTORS.
Jean Francois Bequet
Roger Van Asbroeck
Paul Dubois

BY *Spencer & Kaye*

ATTORNEYS.

Patented July 10, 1973 3,744,952

INVENTORS.
Jean Francois Bequet
Roger Van Asbroeck
Paul Dubois

BY *Spencer & Kaye*
ATTORNEYS.

CORRUGATION APPARATUS

CROSS-REFERENCE TO RELATED APPLICATION

This application is related to applicants' copending application Ser. No. 102,607 filed on Dec. 30, 1970 now Pat. No. 3,661,694 based on Belgian Pat. No. 743,922 which issued on an Application filed in Belgium on Dec. 31, 1969.

BACKGROUND OF THE INVENTION

The present invention concerns a device for the continuous polygonal corrugation of hot sheets constructed of a thermoplastic material. This device is of particular advantage when the sheets intended to be corrugated have previously been subjected to a bidirectional orientation.

Among the various configurations of corrugated sheets of thermoplastic material which are on the market at present, those having a polygonal cross section are very successful.

Up to now, these sheets have been made by, for example, using devices which grip the edges of the sheets to be treated and, while the latter are being softened as a result of a previous heat treatment, the sheets are then passed through a corrugating device which comprises a fixed mold and a counter-mold. The terminal portion of these molds has cooling systems, such as circulating cold fluids, which solidify the sheet in the form determined by the geometry of the forming molds.

This corrugating operation is accompanied by a slight stretching, both in the transverse and longitudinal directions. However, the bidimensional orientation given to the corrugated sheet remains very low.

If it is desired to produce corrugated sheets with such devices by utilizing sheets of thermoplastic material having previously been subjected to an advantageous bidimensional orientation treatment, it should first be noted that the forces of friction against the fixed molds are such that the sheets are susceptible to being torn.

It is particularly desirable to be able to produce corrugated sheets starting from flat sheets of thermoplastic material which have been subjected to such previous biorientation treatment, since the latter gives to the finished products improved mechanical properties such as increased impact resistance.

If materials such as rigid vinyl chloride are used, the increase of the impact resistance eliminates the necessity of adding reinforcing agents, which are always costly and often are of a very restricted and/or temporary effectiveness.

In order to reduce the forces of friction between the sheet and the shaping molds during, for example, the corrugation of the bioriented sheets of thermoplastic material, the possibility has been considered of utilizing another device known per se in which the forming members move with the sheets during the shaping operation.

Such a device comprises two corrugating trays between which passes the sheet of softened thermoplastic material to be corrugated. These trays support movable chains which are disposed at regular intervals and are driven by driving sprockets mounted on an axis behind the corrugating trays. On these endless chains are fixedly mounted a plurality of shaping shells which are consecutive and contiguous and which produce a continuous profile when in contact with the sheet of thermoplastic material to be treated. The shells have a shape such that by bringing the two trays together, the shells become interdigitated to produce the corrugating profile desired.

The applicants have, however, observed that this type of apparatus would not permit the production of regularly arranged, corrugated articles, and that it would mean a substantial expense of calories.

For example, corrugation tests have shown that in spite of the care with which the shells are made, there are irregularities in the corrugated articles at the junction between nearly all the sheets. These irregularities are the result of:

1. small differences in the geometry of the shells and the links of the chains;
2. slight play which exists during the mounting of the shells on the chains, with the result that the shells are laterally off-set or slightly pivoted; and
3. stresses applied to the shells with the result that, consecutive shells are disconnected during operation.

The first two causes of irregularities can be decreased by calibrating each shell and by bringing modifications to the system of mounting the shells on the chains. The third cause can be minimized by reinforcing the chains in order to reduce their elongation under the effect of the tensions applied during the operation.

These improvements are, however, very costly, because a large number of shaping shells is required and the process is relatively inefficient.

On the other hand, in the case sheets made of a rigid vinyl chloride resin — especially polyvinyl chloride — the sheets which are subjected to corrugation should be heated to a temperature of 90°–120° C when they are bidirectionally oriented and from 90°–135° C if there is no such treatment.

However, when the corrugation of these sheets is carried out they should be cooled down, while retaining their shape, to a temperature which is lower than the glass transition temperature of the resin so that the corrugated articles will keep their shape at room temperature.

It is, therefore, desirable to adjust the temperature of the shaping shells to the thermic cycle of the thermoplastic material which is used by, for example, preheating the shells before they contact the sheets to be treated and by cooling them after they contact the sheets.

Independently of the fact that this thermic cycle to which the shells have been submitted is a fourth irreducible cause of formation of irregularities on the corrugated articles, it should be noted that these successive operations of reheating and cooling constitute a costly expense of energy which, depending on the shapes and the weights of the shells, uses up to 3 to 10 times more calories than the heating of the sheet to its corrugating temperature.

SUMMARY OF THE INVENTION

An object of the present invention is to provide a corrugating device which enable the aforementioned disadvantages to be economically overcome.

The corrugating device according to the present invention is provided with endless elements formed of metallic wires which are welded end-to-end and are mounted and held in space exactly where the sheets should be bent to produce the corrugation desired; the endless elements accompanying the sheets during their passage through the device.

During the progressive corrugation of the sheets, these endless elements are held from behind — that is, from the side thereof which is not in contact with the sheets — either by fixed supports which are self-lubricating and anti-wear or by movable supports which are displaced at a speed which is substantially equal to that of the treated sheets.

Means for heating the endless elements may be provided ahead of the location where they come into contact with the sheets to be corrugated, and means to cool down these endless elements should be disposed subsequent to this same location.

DESCRIPTION OF THE PREFERRED EMBODIMENTS

Figure 1:
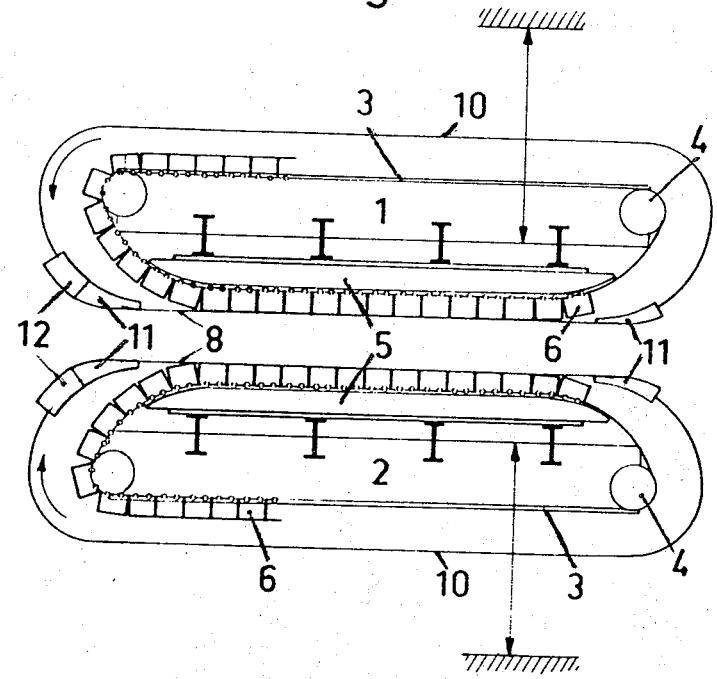
FIG. 1 is a schematic side elevation view of a device according to the invention.

As illustrated in the drawings, the corrugating device has a conventional frame, not illustrated, on which are mounted in a known manner two corrugating trays 1 and 2. Trays 1 and 2 are mounted for movement toward and away from one another and can be arranged close to or distant from one another.

Each corrugating tray 1,2 is provided with suitable known endless chain 3. Chain 3 are uniformly spaced and judiciously disposed depending on the corrugating profile which is desired. These endless chains 3 are driven by means of suitable known driving sprockets 4 and move on respective guide rails 5. The endless chains 3 support a series of corrugating fingers formed by U-shaped shells 6 the upper edges of each leg of which define notches 7 dimensioned to receive and hold endless elements 8 which are, for example, formed of metallic wires welded end-to-end. The wires forming elements 8 may be made for example, of a suitable steel.

Figure 2:
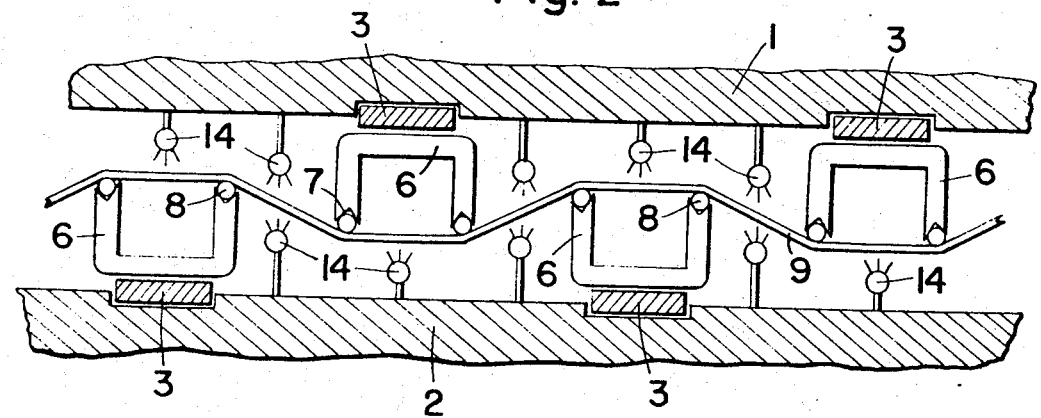
FIG. 2 is a schematic end view of a portion of the device of FIG. 1 illustrating the position of the continuous element when a corrugated article of trapezoidal form is made.

The geometric form and the arrangement of the series of shells 6 are such that when the corrugating trays 1 and 2 are brought close together the shells 6 of the trays 1,2 are interdigitated in dependence on the corrugated cross section 9 desired, as shown in FIG. 2.

As illustrated in FIG. 1, the return path 10 of the elements 8 can advantageously be different from that of the shells 6 in order to prevent the radiuses of curvature of elements 8 from producing stresses which are higher than the limit of elasticity of the material which constitutes the elements 8. That is, the radiuses of curvature are dimensioned to maintain the stresses in elements 8 below the limited elasticity of their material. In this case, it would appear useful to provide guiding elements 11 at the end of and even at the beginning of the return paths of elements 8 in order to make sure that the various elements 8 are directly arranged and held in the notches 7 of the shells 6. The rigidity of the elements 8 themselves will cause them to follow path 10.

The travelling speed of the shells 6 should be substantially equal to the speed of the sheet to be treated. In this manner, when the corrugating trays 1, 2 are brought close together, the elements 8 are held between the shells 6 and a sheet to be corrugated (not shown) and are driven at the same speed as the latter.

Figure 3:
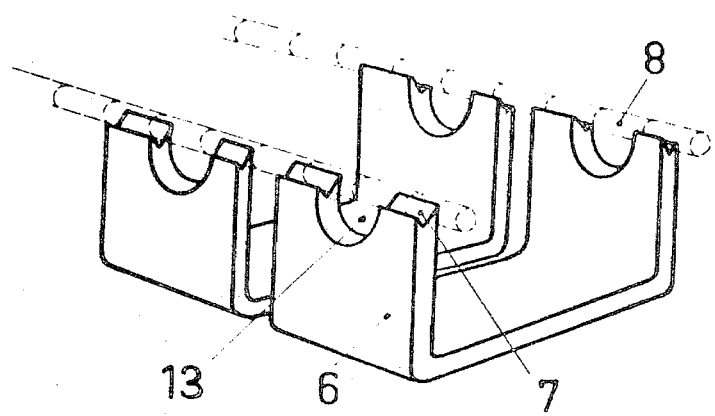
FIG. 3 is a perspective view, partly in cross section, illustrating the shells which support the continuous elements.
Figure 4:
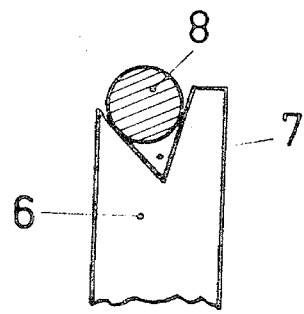
FIG. 4 is an end view of a portion of a shell according to FIG. 3 along with an endless element shown in cross-section.

The device may also have conventional heating elements 12 for heating the elements 8. These elements 12 which may be, for example, electric resistance heaters, are mounted ahead of the adjacent elements 8 upstream of the point where the elements 8 come into contact with the sheet of thermoplastic material to be corrugated. The device can also have conventional cooling elements 14 for cooling the elements 8. Elements 14 may be, for example, cold air jets 14 which are directed towards the sheet and the elements 8 downstream of the point where this sheet is completely brought into its desired corrugated form. The elements 8 should, for example, be heated to a temperature in the range of 90° to 120° C for bidirectionally oriented sheets and 90° to 135° C for untreated sheets, and cooled to a temperature below the glass transition temperature of the resins. With the apparatus described above, the applicants have produced corrugated sheets in accordance with the cross-sectional profile of FIG. 2 from sheets made of rigid, bidirectionally oriented vinyl chloride resins. The following advantages have been found:

1. the edges of the corrugated articles are well defined and are regular. The aspect of the corrugated sheets is not deformed by shells 6 which are irregular or are badly disposed on the endless chains 3, because the elements 8, which extend out from these shells 6, are rigid enough to perfectly realign the shells 6. In addition, elements 8 have continuous profiles which are firmly and substantially in contact with the sheets during the corrugation. As illustrated in FIG. 3, the consecutive shells 6 are not necessarily contiguous, as long as the distance which separates two consecutive shells 6 is not such that the elements 8 sag under the action of the sheet of thermoplastic material to be corrugated;

2. the cost of the apparatus is substantially lower since it is not necessary to use shells 6 which have been precision machined, nor endless chains 3 that will not lose their shape; and 3. the output in calories is substantially decreased since it is sufficient that only the elements 8 be thermically conditioned. Furthermore, the calorie losses by conductivity between the elements 8 and the shells 6 can easily be reduced to a minimum by making the notches 7 in such a manner that the latter are in contact with the elements 8 only along two generating lines of these elements 8, the latter being preferably of a circular cross section. That is, as can be seen from FIG. 4, an element 8 with circular cross section contacts a notch 7 only at two points of the surface of the elements 8. Elements 8 are shown in phantom lines in FIG. 3 to clearly show notches 7. The calorie losses may also be reduced by forming cut-out portions 13 (FIG. 3) in the walls of the shells 6.

Even though the device according to the present invention would appear to be particularly useful for producing a polygonal corrugation of bidirectionally oriented sheets of plastic material, it may also be used with advantage to produce corrugated articles from sheets of thermoplastic material which have not previously been bioriented. Examples of bidirectionally oriented sheets suitable for use with the present apparatus may be found in applicants' copending application referred to on Page 2 of this specification.

It is, however, to be understood that the embodiment described above is not intended to limit the scope of the present invention, since it is obvious that the device which is described can be modified without departing from the scope or spirit of the invention. In particular, the supports for the continuous elements 8 have been indicated as movable, but it is apparent that these supports may also be fixed in place by suitable, known self-lubricating and anti-wear devices.

It will be understood that the above description of the present invention is also susceptible to various other modifications, changes and adaptations, and the same are intended to be comprehended within the meaning and range of equivalents of the appended claims.

We claim:

1. In apparatus for the continuous longitudinal corrugation of hot sheets of thermoplastic material having a predetermined speed and direction of movement along a flow path through the apparatus, the improvement comprising, in combination:
    a. first and second tray means arranged opposite one another and having corrugating fingers arranged in an interdigitating manner for defining a predetermined longitudinal corrugation in a sheet moving longitudinally along the flow path through the apparatus; and
    b. means associated with each of said tray means and arranged for movement in the direction of movement of the sheets of thermoplastic material at a speed substantially the same as the speed of the sheets of material and being a plurality of endless elements formed of metallic wires fastened together end-to-end.

2. An apparatus as defined in claim 1, wherein each of said tray means is mounted for selective movement toward and away from the other of said tray means.

3. In apparatus for the continuous corrugation of hot sheets of thermoplastic material having a predetermined speed and direction of movement along a flow path through the apparatus, the improvement comprising, in combination:
    a. first and second tray means arranged opposite one another and mounted for selective movement toward and away from each other, each tray means having corrugating fingers formed by a plurality of U-shaped shells and arranged in an interdigitating manner for defining a predetermined corrugation in a sheet moving along the flow path through the apparatus;
    b. means associated with each of said tray means and arranged for movement in the direction of movement of the sheets of thermoplastic material at a speed substantially the same as the speed of the sheets of material and being a plurality of endless elements formed of metallic wires fastened together end-to-end; and
    c. movable endless chains, with said U-shaped shells mounted on said endless chains and each having a pair of legs each of which defines a notch dimensioned to receive and hold a respective one of said endless elements and arranged to put said endless elements in contact with the sheets of thermoplastic material.

4. An apparatus as defined in claim 3, wherein said endless elements and said shells have return paths and the return paths of said endless elements are different from the return paths of said shells and have radiuses of curvature dimensioned to maintain the stresses in said endless elements below the limit of elasticity of the metallic material from which said endless elements are made.

5. An apparatus as defined in claim 4, further including means arranged adjacent the beginning and the end of the return path of each of said endless elements for guiding said endless elements and for directly arranging said endless elements in said notches.

6. An apparatus as defined in claim 5, further including means arranged adjacent the end of the return path of each of said endless elements for heating said endless elements.

7. An apparatus as defined in claim 6, further including means for cooling the corrugated sheet and said endless elements and arranged after the point where the sheet of thermoplastic material is completely brought to the corrugated desired form.

* * * * *